United States Patent [19]

Froese et al.

[11] 4,365,346

[45] Dec. 21, 1982

[54] BUILT-IN LINEARITY TESTING ARRANGEMENT FOR AN FM RADIO SYSTEM

[75] Inventors: Abram Froese, North Vancouver; Larry Y. Onotera, Surrey; Alvin Liebelt, Vancouver, all of Canada

[73] Assignee: AEL Microtel, Ltd., Burnaby, Canada

[21] Appl. No.: 239,770

[22] Filed: Mar. 2, 1981

[51] Int. Cl.³ .................... H04B 1/00; H04B 17/00
[52] U.S. Cl. ................................. 455/42; 455/67
[58] Field of Search .............. 455/42, 43, 67, 115, 455/226

[56] References Cited

U.S. PATENT DOCUMENTS

| | | | |
|---|---|---|---|
| 3,195,047 | 7/1965 | Ruthroff | 455/67 |
| 3,271,679 | 9/1966 | Fostoff | 455/67 |
| 3,492,579 | 1/1970 | Carassa | 455/67 |
| 3,492,583 | 1/1970 | Sinelli | 455/226 |

*Primary Examiner*—Jin F. Ng
*Attorney, Agent, or Firm*—Leonard R. Cool

[57] ABSTRACT

The baseband input to a frequency modulation radio transmitter is switchably connectable to a square wave generator, the amplitude of the square wave output being adjusted to provide a predetermined deviation of the FM radio transmitter. The output frequency of a pilot oscillator is also applied to the baseband input and is subjected to amplitude modulation because of non-linearities which exist in the system and which adversely affect the signal during transmission through the system.

At the receiving end of the radio system, the receiver output contains a signal comprising the pilot frequency and a superimposed amplitude modulated signal, and this signal is applied to a product detector. The output of the product detector is a pulsating DC signal comprising a basic DC component, which is representative of the amplitude of the pilot frequency, and an AC component, which is representative of the system non-linearity. The pulsating DC signal is applied to one terminal of a capacitor. The AC component appears at the other terminal and is rectified and integrated to obtain a DC signal, the amplitude of which is proportional to the slope component in the system non-linearity. This DC signal is measured by a direct current meter.

5 Claims, 1 Drawing Figure

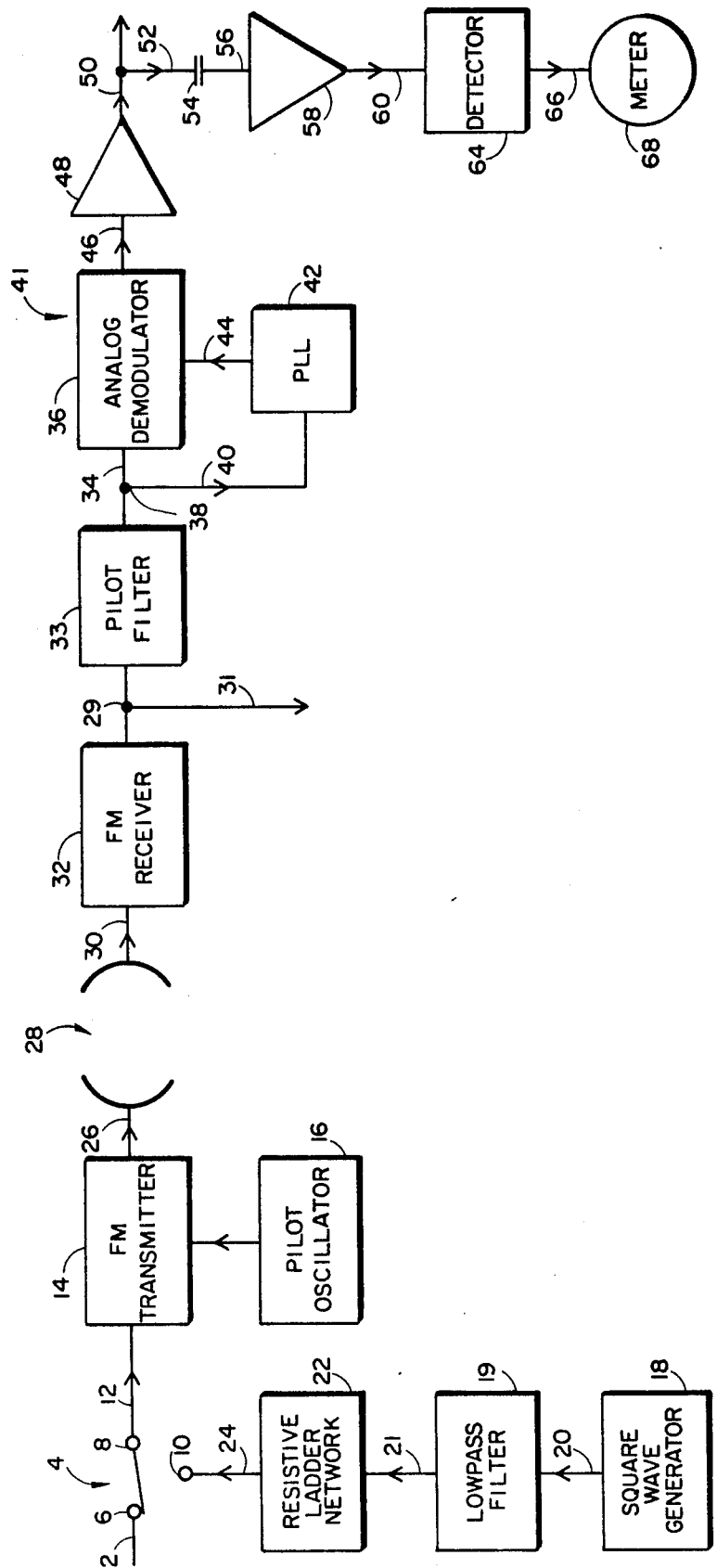

BUILT-IN LINEARITY TESTING ARRANGEMENT FOR AN FM RADIO SYSTEM

FIELD OF INVENTION

This invention relates to microwave radio communications, and in particular to apparatus incorporated in the system which may be used to measure the non-linear transmission characteristics of the radio communications link.

BACKGROUND OF INVENTION

In the telecommunications field, it is often desirable and frequently necessary to ascertain certain transmission characteristics, such as relative group delay, linearity, differential phase and gain, of a microwave radio communication link (MRCL). In particular, the slope of the system linearity affects the transmission characteristic. The practical methods which are most commonly employed today to make field measurements of radio transmission characteristics use commercially available transmission test sets. Typical of such commercial equipment are GTE Italia CSM 221/C - 222/C Radio Link Test Set (Milan, Italy), the Hewlett-Packard 3710/3702 Link Analyzer (Palo Alto, Calif.), and the Siemens K1005/K1046 Sweep Frequency Test Sets. While such test sets can be used to perform the required testing of performance, the disadvantages are the requirement for additional, expensive equipment and the problem of having the test equipment at the transmitter and receiver ends of the system. These disadvantages are overcome by having the facility built-in and at relatively nominal cost.

SUMMARY OF INVENTION

A square-wave signal having the amplitude adjusted to provide a predetermined deviation is applied to the baseband input of FM transmitter. A pilot oscillator frequency is also applied to this baseband input. System non-linearities cause amplitude modulation of the pilot frequency and the amplitude of this modulation is proportional to the slope component in the system non-linearity. At the receiver, the pilot is recovered and the amplitude modulated signal is separated therefrom. The amplitude of said separated signal is used as a measure of the slope in the system non-linearity.

BRIEF DESCRIPTION OF DRAWING

The single FIGURE of the drawing is a block diagram which shows the essential elements of the built-in system linearity test arrangement for both the transmitter and receiver ends of an FM radio system.

DETAILED DESCRIPTION OF EMBODIMENTS

Referring now to the single FIGURE of the drawing, it may be seen that switch 4 has terminal 8 thereof connected to path 12 which is the input path to FM transmitter 14. Normal baseband signals are applied via path 2, contacts 6 and 8 of switch 4 to the baseband input of transmitter 14. The pilot frequency is applied from pilot oscillator 16 to a separate baseband input of the FM transmitter 14 which is always connected. The built-in test arrangement includes a square-wave generator 18, the square wave output of which is connected via path 20 to the input of low pass filter 9, which provides a roll-off at the upper frequencies and, thus, prevents interference with the frequency from pilot oscillator 16. In one embodiment of the invention, a $33\frac{1}{3}$ Hz square wave signal was generated in 18 and provided on path 20 and a 10 kHz low pass filter 19 was used to insure that there was no adverse interference with a 100 kHz frequency from pilot oscillator 16. The filter shaped signal is then applied along path 21 to resistive ladder network 22. The network 22 is employed to permit the adjustment of the signal amplitude so as to provide the appropriate deviation as required for testing of the linearity of the transmission system. The test frequency used in preferred embodiments is between 0.15 Hz and 100 Hz. The amplitude is determined by the transmission path bandwidth to be tested, e.g., the two carrier frequencies above and below the nominal center frequency of the F system at which the relative difference in the linearity is to be measured. The properly adjusted signal is applied via path 24 and contacts 10 and 8 of switch 4 to the baseband input of the FM transmitter 14. Thus the built-in test facility does not provide for in-service testing but does provide an inexpensive out-of-service built-in test facility, thus avoiding the problems of (1) insuring that the appropriate test equipment is at the transmitter and receiver locations, and (2) setup and test by using the commercial test equipment.

Because of the low-frequency deviation of the pilot oscillator by the shaped square-wave signal, any non-linearity slope which appears in the transmission path will adversely affect the amplitude of the pilot and, thus, will appear as an amplitude modulated signal on the recovered pilot at the output of FM receiver 32. Pilot filter 33 separates the pilot frequency from the other frequencies present at the output of FM receiver 32. The normal baseband signals pass along to standard terminal equipment not shown. The pilot signal passes through filter 33 to product detector 41 which in a preferred embodiment comprises an analog demodulator 36 and a phase-lock loop including the input path 40 from the output of the pilot filter, the phase lock loop 42 and the output of the phase lock loop on path 44 into the input of the analog demodulator. Such an arrangement provides for a DC signal output on path 46. It should be noted that any amplitude modulation detector may be employed to recover the signal which includes the slope component of the system non-linearities. Because of the amplitude modulation occurring as a result of the system non-linearities, the signal on path 46 will be a pulsating DC. The basic DC component of the pulsating DC signal is a signal which is representative of the amplitude of the pilot frequency. Superimposed on this basic DC component is the AC component which results from the amplitude modulation resulting from the transmission of the pilot signal through a system including non-linearities. The pulsating DC is amplified in amplifier 48 and is passed along path 50 to a pilot level detector. At the node 52 on path 50, the capacitor 54 is connected so as to bridge onto this output path. Capacitor 54 blocks the basic DC component of the pulsating DC signal, but allows the alternating current component to pass to path 56 and amplifier 58, path 60 to detector 64. In detector 64 the AC component is rectified and the output is applied to an integrator in order to obtain an average DC signal output on path 66 the amplitude of which is representative of the slope component of the system non-linearities. This DC signal is applied to a direct current meter 68 which monitors the system. Where possible, those elements which cause non-linearities in the system are adjusted so as to obtain a minimum reading on meter 68.

While the invention has been particularly shown and described with reference to a preferred embodiment thereof, it will be understood by those skilled in the art that change in form and detail may be made without departing from the spirit and scope of the invention.

What is claimed is:

1. In a radio system, including a transmitter and a receiver, which employs frequency modulation, apparatus or providing a built-in system linearity test arrangement comprising:
   a transmitter having a baseband input terminal or accepting information and test square wave signals to be conditioned for radio transmission to said receiver;
   a pilot frequency oscillator having an output terminal connected to another input terminal of said transmitter;
   means for selectively applying said test signal to said baseband input terminal, said test signal being adjusted to provide a predetermined deviation of said frequency modulation transmitter;
   an FM receiver adapted to receive the signals conditioned for transmission, and to process said received signals so as to substantially recover and provide at an output port thereof the transmitted pilot and test signals, said receiver also providing at said output port, as a result of interaction between the pilot and square-wave test signals because of system non-linearity, an AC signal which may be superimposed thereon;
   means connected to the output port of said receiver for detecting said superimposed AC signal and providing a signal representative of the amplitude thereof at an output terminal; and
   means for measuring the amplitude of said representative signal.

2. Apparatus as set forth in claim 1 wherein said means for selectively applying comprises:
   switch means having first and second input terminals adapted respectively, to receive the information signals and the square-wave test signals and to selectively apply either one or the other of the said signals to said baseband input of said transmitter;
   a square-wave generator having a predetermined pulse repetition rate for providing said test signal; and
   means for adjusting the amplitude of said square-wave generator so as to obtain said predetermined deviation of said transmitter.

3. Apparatus as set forth in claim 2 wherein said AC signal detecting means comprises:
   a product detector having an input connected to the output port of said receiver, said detector deriving a pulsating DC signal comprising a basic DC component, which is representative of the amplitude of said pilot frequency, said pulsating DC signal including an AC component superimposed on said basic DC component, the amplitude of said AC component being a measure of the slope component of the system non-linearity.

4. Apparatus as set forth in claim 3 wherein said means for detecting comprises:
   a capacitor having one terminal connected to receive said pulsating DC signal and providing at the other terminal said AC component;
   an amplifier having the input terminal connected to said capacitor other terminal and providing the amplified AC signal at an output terminal; and
   means for deriving a DC signal, the amplitude of which is proportional to said AC signal and, hence, to the slope in the system non-linearity.

5. In a radio system, including a transmitter and a receiver, which employs frequency modulation of information signals, apparatus for providing a bulit-in system linearity test arrangement comprising:
   a transmitter having a baseband input terminal for accepting signals to be conditioned for radio transmission to said receiver;
   a pilot frequency oscillator having an output terminal connected to an input terminal of said transmitter baseband;
   square-wave generation means for providing a predetermined deviation of said frequency modulated transmitter at an output terminal when said output terminal is connected to the baseband input of said transmitter;
   switch means having first and second input terminals adapted respectively, to receive the information signals and the square-wave test signals and to selectively apply either one or the other of the said signals to said baseband input of said transmitter;
   a frequency modulation receiver adapted to receive the frequency modulated signals from said transmitter and to process said received signals so as to substantially recover and provide at an output port the transmitted pilot and square-wave test signals transmitted, said receiver also providing at said output port the recovered pilot frequency which, as a result of interaction between the pilot and square-wave test signals, because of system non-linearity, may have superimposed thereon and AC signal, thus providing at an output an altered pilot frequency signal;
   a product detector for deriving a DC signal which is representative of the amplitude of said altered pilot frequency, said DC signal including said AC signal superimposed thereon, the amplitude of said AC signal being proportional to the slope in the system non-linearity;
   means for detecting said AC signal; and
   means for measuring the amplitude of said detected AC signal.

* * * * *